Inventors
Raymond Louis Filliette
Robert Henri Launga
By
Karl W. Flocks
Attorney May 28, 1968 R. L. FILLIETTE ETAL 3,386,068
PROGRAMME CONTROL APPARATUS FOR ANALOGUE VALUES
Filed Jan. 23, 1967 5 Sheets-Sheet 4

Inventors:
Raymond Louis Filliette
Robert Henri Laupa
By
Karl W. Flocks, Attorney May 28, 1968   R. L. FILLIETTE ETAL   3,386,068
PROGRAMME CONTROL APPARATUS FOR ANALOGUE VALUES
Filed Jan. 23, 1967   5 Sheets-Sheet 5

United States Patent Office 3,386,068
Patented May 28, 1968

3,386,068
PROGRAMME CONTROL APPARATUS FOR ANALOGUE VALUES
Raymond Louis Filliette, Rueil-Malmaison, and Robert Henri Lauga, Colombes, France, assignors to La Telemecanique Electrique, Nanterre, Hauts-de-Seine, France, a joint-stock company of France
Filed Jan. 23, 1967, Ser. No. 610,998
Claims priority, application France, Jan. 24, 1967, 47,019
6 Claims. (Cl. 338—128)

ABSTRACT OF THE DISCLOSURE

An electrical control apparatus with variable programmes of analogue quantities intended to control for example a plurality of electric motors, each at a predetermined speed. The apparatus comprises a group of rotating potentiometers, the bodies of which are elastically mounted on a fixed support while their insulating sliders are mounted on removable programme cards which are placed as desired in the cover of the apparatus facing the fixed support, means being provided for precisely adjusting the position of the sliders to the desired adjustment value.

---

The present invention relates to an electric control apparatus with variable programmes of analogue quantities intended to operate, for example, a plurality of electric motors, each at a pre-determined speed.

Programme devices are already known, consisting of boxes or frames with contacts, in which perforated cards can be inserted providing switching combinations in accordance with the programmes fixed by these cards.

Perforated cards essentially lend themselves to combinations codified in the binary system, that is to say to numerical control of machines.

When it is required to effect the control by so-called analogue quantities which are continuously variable, the means employed must be different.

To this end, there has already been proposed an apparatus consisting of a chassis intended to receive at will, through the intermediary of plug contacts, cards programmed in analogue quantities.

The unit programme card comprises as many potentiometers as there are devices to be controlled, each potentiometer, which essentially comprises a resistance winding and a moving slider operated by a knob, being pre-set on its card to the desired value.

With an arrangement of this kind, there must therefore be provided as many groups of potentiometers as there are pre-set programmes, and this results in the two following major disadvantages:

On the one hand, each programme card is a complex and bulky device;

On the other hand, the total cost of all the cards is very high.

There has also been proposed an apparatus consisting of a casing, in the interior of which is housed a group of potentiometers, the straight windings of which are mounted parallel to each other on an elastic cushion which lines the bottom of the casing, while the sliders of the said potentiometers are mounted on a removable card which fits into the cover of the casing.

This apparatus has the following major drawbacks:

The pressure of the contacts being solely ensured by the elasticity of the supporting cushion is in consequence weak, irregular and doubtful and depends on the positions of the various sliders. Furthermore, if there is a bad contact, the cover must be opened in order to obtain access to the sliders, and this makes any checking impossible since the elements in contact are then separated;

The sliders of the removable card are not adjustable in the working position of the apparatus, which renders this latter unusable for the purposes of calibration or adjustment of speeds.

The present invention relates to an apparatus which overcomes the major disadvantages referred to above and which offers new facilities of use.

The apparatus in accordance with the invention is essentially characterized by the fact that it comprises a group of rotating potentiometers, each of which is mounted elastically on a fixed support and is constituted by the inseparable assembly of a flexible disc mounted at a short distance from a circular winding, while the sliders, constituted by insulating push-buttons, are mounted on a removable card which does not comprise any conducting member, means being provided for the precise adjustment of each of the group of sliders at the point corresponding to the desired adjustment value, on the flexible disc of the potentiometer group which corresponds to it.

In accordance with other characteristic features of the invention:

Each programme card, advantageously made of plastic material, is provided with as many circular recesses as there are sliders, the sliders pivoting in the said recesses forming bosses;

Each slider is elastically mounted in its recess and is provided with a system of notches adapted to come into engagement with corresponding projections fixed on the card, whereby it is possible to rotate the said slider so as to bring it into the desired angular position, the elastic system bringing the notches into engagement with the projections and locking the assembly in the position corresponding to the programme desired;

The bodies of the potentiometers which are mounted elastically on the fixed support are coupled together in pairs by means of a flexible blade against which they are locked in such manner as to prevent them from rotating with respect to each other;

The programme cards are mounted at the rear of a cover which can be folded and locked in the closed position, the said cards being provided with asymmetric lateral tongues fitting into corresponding grooves of the cover;

The programme cards comprise two orifices of different sections which enable them to be stored in a rack of corresponding shape, without risk of inverting their correct position by error;

The cover is provided with an inspection door giving access to openings which permit the sliders to be adjusted in their respective positions corresponding to a pre-determined programme, by means of a screw-driver;

The programme cards are provided with small tongues which can be broken so as to ensure the operation of switches putting one or more of the controlled machines out of circuit.

Other characteristics, advantages and particular features of the present invention will be brought out in the description which follows below of one possible form of construction of a programme control apparatus for analogue values according to the invention, reference being made to the accompanying drawings, in which.

Figure 1:
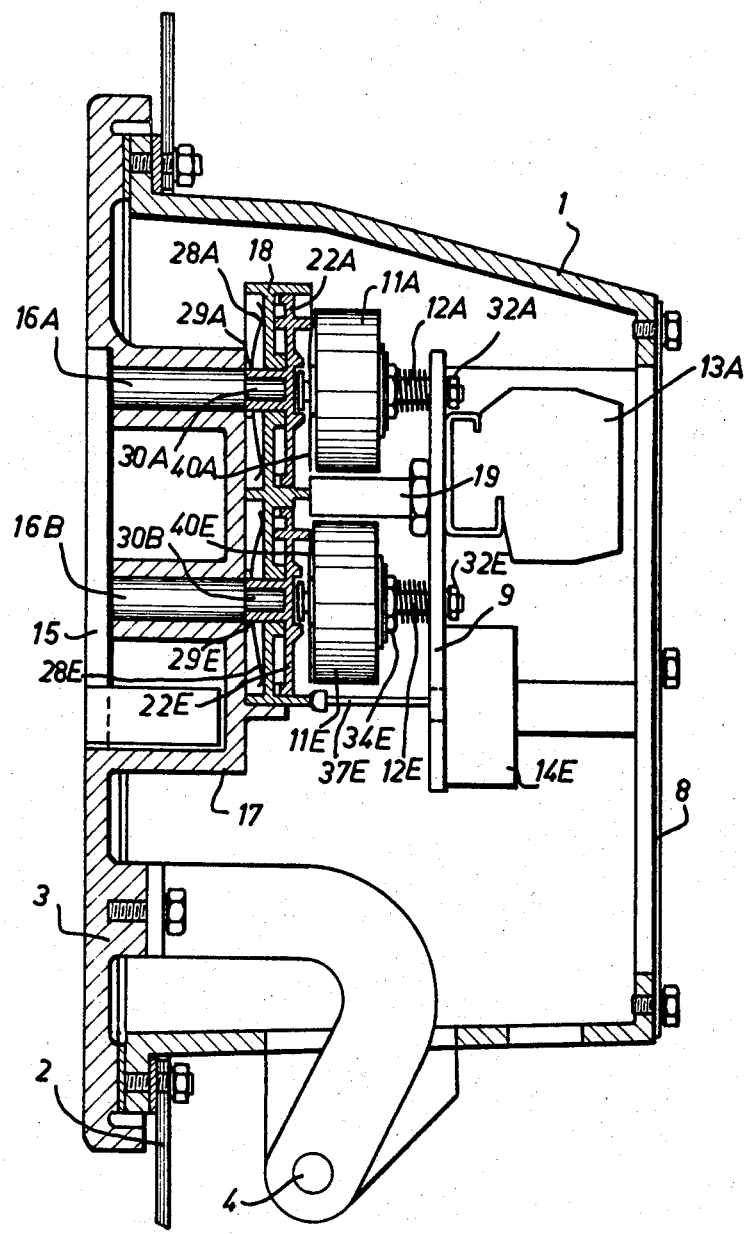
FIG. 1 is a view in elevation of a transverse section of the apparatus.
Figure 2:
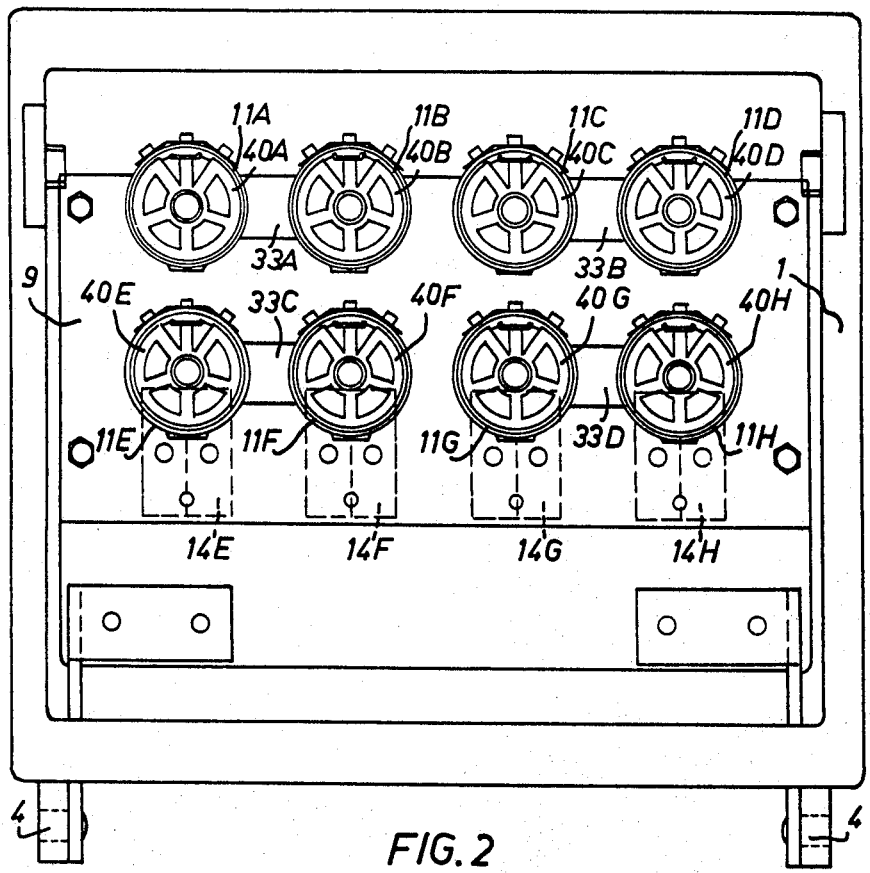
FIG. 2 is a view in elevation, the cover not being shown for the sake of clearness of the drawing.
Figure 3:
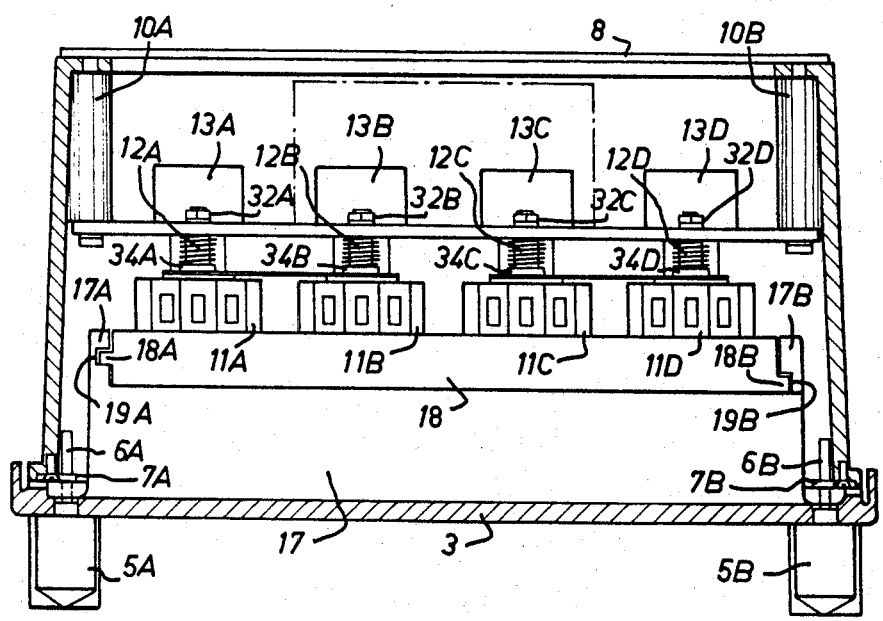
FIG. 3 is a cross-section in plan view.

The apparatus shown by way of example in the drawings comprises essentially a casing 1, preferably built into a switchboard 2, which is provided with a cover 3 pivotally mounted on hinges 4, the said cover being locked in the position of closure by means of two pivoted handles 5A and 5B provided with hooks 6A and 6B which engage on stop-members 7A and 7B fixed to the casing 1. The rear portion of the casing 1 is closed by a removable plate 8, while a plate support 9 is fixed to the interior of the casing on lateral bosses 10A and 10B so as to receive on the one hand a group of potentiometer bodies (eight in the present case) 11A to 11H which are elastically mounted by means of springs such as 12A, 12B, 12C, 12D, . . . these bodies being turned towards the cover; and on the other hand, a group of connection terminals turned towards the bottom and shown diagrammatically at 13A, 13B, 13C, 13D, . . . , and a group of switches shown diagrammatically at 14E, 14F, 14G, 14H, . . . .

Figure 7:
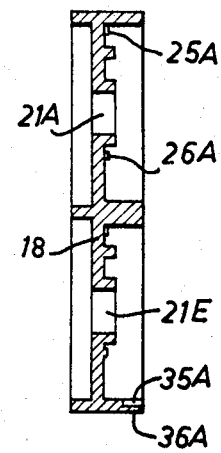
FIG. 7 is a cross-section taken along the line VII—VII of FIG. 5.
Figure 5:
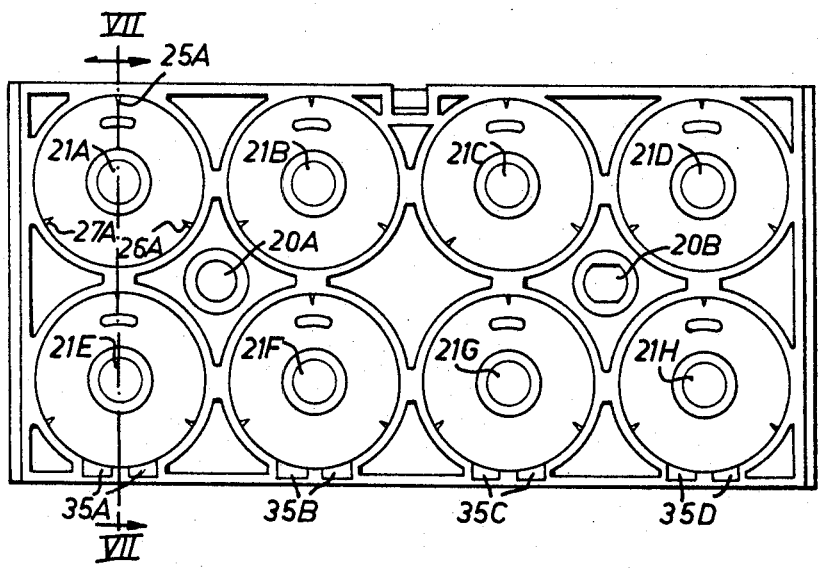
FIGS. 5 and 6 show respectively the rear face and the front face of the programme plate or card proper, in which the sliders of the potentiometers are fitted.
Figure 6:
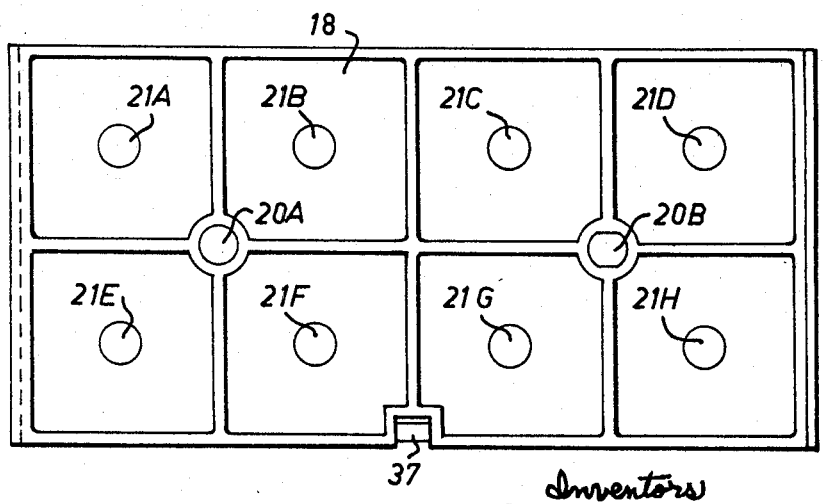

In addition, the pivoted cover 3 comprises an inspection door 15 which uncovers two openings 16A and 16B, the function of which will be described in more detail later, and which pass through a supporting shoulder 17 intended to receive, by means of two lateral bosses 17A and 17B, a programme card indicated by the general reference 18 and which is shown in detail in FIGS. 5, 6 and 7.

Each programme card 18 is advantageously made of plastic material and is arranged in such manner that it can occupy one position and one position only both in the support 17 of the cover 3 and in the storage rack (not shown), thereby avoiding any risk of causing errors in the programmes due to the inversion in position of the programme cards with respect to the group of potentiometers.

With a view to the above objects, the plates 18 are provided with two lateral tongues 18A and 18B which are arranged asymmetrically and fit into corresponding grooves 19A and 19B formed in the lateral bosses 17A and 17B of the support 17 of the cover.

In addition, centering means, constituted in the example shown by studs such as the stud 19, ensure the exact position of the card 18 when the cover 3 is in the closed position, as shown in FIG. 1, by coming into engagement with the holes 20A and 20B formed in the plate 18. It should be noted that the section of the holes 20A and 20B is different, which permits the storage of the cards in a rack of corresponding shape (not shown) without risk of inverting their correct position by error.

Figure 9:
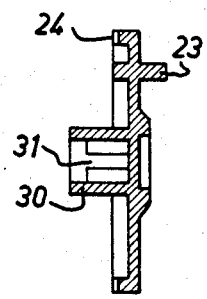
FIGS. 8 and 9 show respectively in elevation and in transverse section a potentiometer slider.
Figure 8:
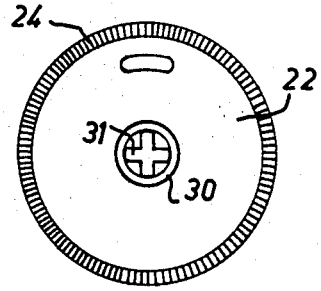

Each programme card 18 comprises as many circular recesses (eight in the present case) 21A, 21B, 21C, 21D, 21E, 21F, 21G, 21H, as there are potentiometers and sliders such as 22A and 22E. Each of the sliders (see FIGS. 8 and 9) is constituted by a moulded piece of insulating material 22 of circular shape, pivoting in a boss corresponding and provided in the rear face of the card 18, as can best be seen from FIGS. 1 and 5. Each slider is provided with a pressure finger 23 which ensures the adjustment of the corresponding potentiometer, as will be seen later, and with a system of notches which makes it possible to fix the slider in a pre-determined angular position by means of engagement of the said notches with three teeth such as 25A, 26A, 27A rigidly fixed on the plate 18. Each slider is held elastically in position in its boss by means of a spring such as 28A and 28E, supported on a collar such as 29A, 29E keyed on the shaft 30, 30A, 30B . . . of the slider, the said shaft pivoting in the corresponding hole 21A, 21B . . . 21H formed in the plate 18.

Each slider can be brought into the desired angular position by means of a screw-driver (not shown) which, after having withdrawn the inspection door 15 of the cover held in the locked position, is introduced through the openings 16A and 16B and comes into engagement in a mortice 31 in the form of a cross (FIG. 9) formed in the forward extremity of the shaft 30.

On the other hand, each of the potentiometers 11A . . . 11H, is mounted on a stud 32A . . . 32H free in a corresponding supporting hole formed in the plate 9, with the interposition of the springs 12A . . . 12H. The potentiometers are coupled together in pairs by flexible blades such as 33A, 33B, 33C, 33D which are locked in position on the studs 32A, 32B, 32C, 32D by means of nuts 34A and 34B . . . . These flexible blades 33A, 33B have the purpose of preventing two adjacent potentiometers from mutually turning one with respect to the other.

According to a characteristic feature of the invention, instead of the usual potentiometers in which a rubbing brush is in direct contact with the turns of resistance wire, there are advantageously employed potentiometers which are provided with flexible discs 40A . . . 40H located at a short distance from the circular coils, while the push-rods 23 are of insulating material.

Figure 10:
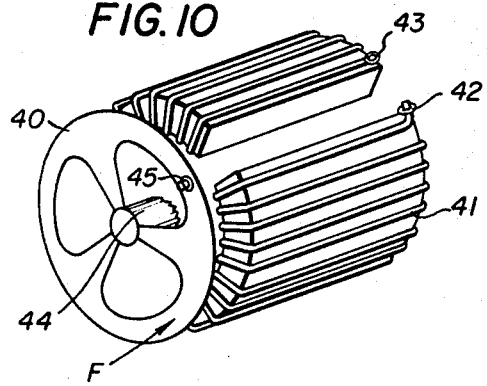
FIG. 10 shows a circular coil, flexible disc type of potentiometer.
Figure 4:
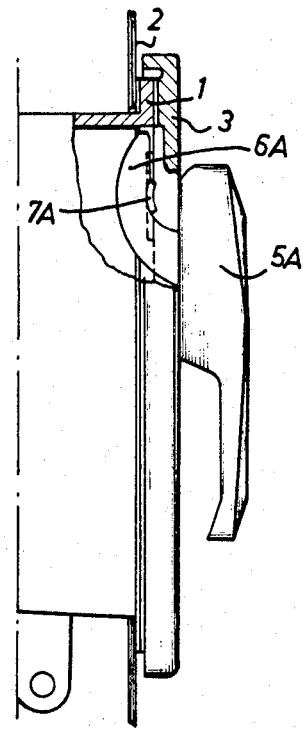
FIG. 4 is a detail view representing the closure device for the cover.

Such a commercially available circular coil flexible disc potentiometer is diagrammatically illustrated in FIG. 10. Therein, winding 41 has one of its extremities connected to a connection terminal 42 while the other end 43 is isolated. The intermediate tapping of winding 41 is ensured by means of flexible disc 40 consisting of a metallic material which is mounted on a spindle 44 of insulating material. Disc 40 is mounted on spindle 44 in such a way that it is only a short distance away from winding 41 and does not touch it. A connection terminal 45 is mounted on disc 40. When a point force F is exerted on disc 40 by means of any kind of an insulated slider, such as by pressure finger 23, one part of disc 40 is put into contact with winding 41 and therefore a portion of the winding between terminal 42 and the point of contact between disc 40 and winding 41 is put into the circuit between terminals 42 and 45, the setting being determined by voltmeters in the circuit as discussed herein.

In accordance with two additional characteristic features, it should be observed that:

On the one hand the programme cards 18 are provided on their lower edges turned towards the rear with vacuoles such as 35A, 35B, 35C, 35D, provided with breakable tongues such as 36A. When the tongues are broken, they form hollows which permit the forward movement of the corresponding push-rods such as 37B (FIG. 1) of the switches 14E . . . 14H, the function of which will be explained below;

On the other hand, the cards 18 are provided on their front faces towards the bottom with a tongue 37 which permits the attachment of a reference label indicating the programme corresponding to the card concerned.

There will be described below, purely by way of explanation and not in any limitative sense, the operation of the apparatus according to the invention, which has been described above.

The potentiometers 11A . . . 11H being suitably connected by the terminals 13A . . . 13D to the installation of motors to be controlled, for example direct-current motors in which the regulation of speed is obtained by variation of the inductor field, the cover 3 is opened and a card corresponding to a pre-determined programme is placed in the support 17; the cover is again closed and locked by means of the handles 5A and 5B. At this moment, the pressure fingers 23 of the different sliders come into contact with the flexible blades of the various potentiometers and ensure the operation of these latter following the regulation which corresponds to the card inserted in the apparatus.

In order to carry out the regulation of each of the programme cards, the operation is as follows:

After having placed a card in position in the apparatus, as has been explained above, the inspection door 15 of the cover is opened. Each of the potentiometers 11A . . . 11H is then adjusted to the desired value by means of a screwdriver, as has been previously described, the speed of the motor being read for example, by means of voltmeters, the voltage of which is supplied by tachometer-dynamos which are known per se.

When the verious sliders have thus been brought to the desired angular positions and locked, the card is removed from the casing 1 and is stored in a rack, the said card, complete with its reference, thus constituting the programme of the desired ratio of speeds between the motors.

It frequently happens that the cards are prepared for a maximum number of motors working simultaneously, for example eight in the present case. By virtue of the invention, it is perfectly possible, when so required, to utilize simultaneously only part of the potentiometers, the motors corresponding to the other potentiometers not being put into operation in the programme desired. The maintenance at rest of these motors is obtained, as has been described above, by the operation of the corresponding switches 14E . . . 14H, by means of push-rods 37E which pass into the notches 35A by breaking the tongues 36A.

Furthermore, the active potentiometers can only be employed between 5% and 100% of the useful values for the variation of speeds of the motor, a percentage less than 5% not being obtainable with sufficient accuracy.

It can thus be seen that each programme card represents a variable number of motors working at pre-regulated speeds.

This apparatus can be employed industrially for example in an installation for dosing the constituents of concrete. Each working motor actuates a screw feed device which delivers on a conveyor belt a certain product at a chosen speed; the proportion of mixture of the constituents depends on the mutual relation of the speeds of the motors.

It is quite obvious that this industrial application is not the only one which can be envisaged and that the apparatus according to the invention has only been described and illustrated purely by way of explanation and not in any sense by way of limitation, and that modifications of detail may be made thereto without thereby departing from the scope of the said invention.

We claim:
1. An electric control apparatus with variable programmes of analogue quantities such as the speeds of electric motors, said apparatus comprising:
   a fixed support;
   a group of rotating potentiometers each constituted by a flexible disc mounted at a short distance from a circular winding;
   a group of elastic coupling systems mounting each of said potentiometers on said fixed support;
   a plurality of removable programme cards each provided with as many moving insulated push-rod sliders as there are potentiometers;
   means for fixing one of said programme cards facing said fixed support, each of said push-rod sliders of the programme card being supported on one of the flexible blades of said group of potentiometers;
   and means for precisely adjusting the position of each push-rod slider on the corresponding flexible disc of the potentiometer.

2. An apparatus as claimed in claim 1 in which each removable programme card has as many circular recesses as there are push-rod sliders, said sliders being adapted to pivot in said recesses.

3. An apparatus as claimed in claim 2, in which each slider is mounted elastically in its recess and comprises a system of notches for locking in an angular position, said system being complementary to a plurality of projections rigidly fixed on said programme card.

4. An apparatus as claimed in claim 1, in which the bodies of the potentiometers elastically mounted on said fixed support are coupled together in pairs by means of a flexible blade against which they are locked.

5. An apparatus as claimed in claim 1, in which the programme cards are provided on the one hand with asymmetric means preventing them from being stored and utilized the wrong way round, and on the other hand with small tongues which can be broken in order to ensure the operation of special switches which put one or more of the electric motors controlled out of circuit.

6. An electric control apparatus with variable programmes of analogue quantities such as the speeds of electric motors, said apparatus comprising:
   a casing provided with a cover which can be swung back and locked in the closed position;
   a fixed support disposed in the interior of said casing;
   a group of rotating potentiometers each constituted by an inseparable assembly comprising a circular winding electrically connected to one of said motors to be controlled, and a flexible blade mounted at a short distance from said winding;
   elastic coupling systems supporting each of said inseparable assemblies on said fixed support;
   a plurality of programme cards each provided with as many insulating push-rod sliders as there are potentiometers;
   means for fixing one of said programme cards in said cover opposite said fixed support, each of said push-rod sliders of the programme card being supported on one of the flexible blades of said potentiometers;
   and access means in said cover to precisely adjust the position of each push-rod slider on the corresponding flexible disc of said potentiometers.

References Cited

UNITED STATES PATENTS

| | | | |
|---|---|---|---|
| 2,847,543 | 8/1958 | Cobb | 338—128 |
| 2,871,324 | 1/1959 | Budd | 338—128 |
| 2,934,730 | 4/1960 | Blackwell | 328—128 X |
| 3,158,419 | 11/1964 | Meyer et al. | 200—46 X |

ROBERT K. SCHAEFER, *Primary Examiner.*

H. HOHAUSER, *Assistant Examiner.*

UNITED STATES PATENT OFFICE
CERTIFICATE OF CORRECTION

Patent No. 3,386,068                          May 28, 1968

Raymond Louis Filliette et al.

It is certified that error appears in the above identified patent and that said Letters Patent are hereby corrected as shown below:

In the heading to the printed specification, line 9, "Jan. 24, 1967" should read -- Jan. 24, 1966 --.

Signed and sealed this 11th day of November 1969.

(SEAL)
Attest:

Edward M. Fletcher, Jr.                      WILLIAM E. SCHUYLER, JR.
Attesting Officer                              Commissioner of Patents